United States Patent
Hesslewood et al.

(10) Patent No.: US 11,524,763 B2
(45) Date of Patent: Dec. 13, 2022

(54) FLOOR PANELS AND FLOORING SYSTEMS FOR A PASSENGER VEHICLE, AND METHODS FOR INSTALLATION

(71) Applicant: The Boeing Company, Chicago, IL (US)

(72) Inventors: Sean Richard Hesslewood, Chicago, IL (US); Howard McKenzie, Chicago, IL (US)

(73) Assignee: The Boeing Company, Chicago, IL (US)

( * ) Notice: Subject to any disclaimer, the term of this patent is extended or adjusted under 35 U.S.C. 154(b) by 16 days.

(21) Appl. No.: 17/160,972

(22) Filed: Jan. 28, 2021

(65) Prior Publication Data

US 2021/0147059 A1 May 20, 2021

Related U.S. Application Data

(62) Division of application No. 15/915,732, filed on Mar. 8, 2018, now Pat. No. 10,919,612.

(51) Int. Cl.
*B64C 1/18* (2006.01)
*B64F 5/10* (2017.01)
(Continued)

(52) U.S. Cl.
CPC .............. *B64C 1/18* (2013.01); *B32B 3/12* (2013.01); *B61D 17/10* (2013.01); *B64C 1/20* (2013.01); *B64F 5/10* (2017.01); *E04F 15/02* (2013.01)

(58) Field of Classification Search
CPC .... B61D 17/10; B62D 25/20; B62D 25/2036; B64C 1/18; B64C 1/20; E04F 15/02; E04F 15/02016; E04F 15/0215
(Continued)

(56) References Cited

U.S. PATENT DOCUMENTS

| 2,199,938 A | 5/1940 | Kloote |
| 6,675,544 B1 | 1/2004 | Ou et al. |

(Continued)

FOREIGN PATENT DOCUMENTS

| DE | 10115009 A1 * | 10/2002 | ............. E01C 5/003 |
| DE | 102015104230 A1 * | 9/2016 | ............... B64C 1/20 |

(Continued)

OTHER PUBLICATIONS

European Search Report prepared by the European Patent Office in application No. 19 15 8756.7 dated Aug. 8, 2019.
(Continued)

*Primary Examiner* — Jason S Daniels
(74) *Attorney, Agent, or Firm* — McDonnell Boehnen Hulbert & Berghoff LLP (57) ABSTRACT

An example floor panel for a flooring system in a passenger vehicle includes a top sheet, a bottom sheet, a body situated between the top sheet and the bottom sheet, and an interlocking feature that extends outward from the body for slidably engaging an adjacent floor panel. An example flooring system in a passenger vehicle includes a first set of floor panels including panels rigidly attached to a structure of the passenger vehicle, and a second set of floor panels and each floor panel of the second set of floor panels has an interlocking feature for slidably engaging an adjacent floor panel and for enabling lateral relative motion to occur and restricting vertical relative motion between panels of the second set of floor panels and a respective adjacent floor panel.

20 Claims, 7 Drawing Sheets

(51) Int. Cl.
*B32B 3/12* (2006.01)
*E04F 15/02* (2006.01)
*B64C 1/20* (2006.01)
*B61D 17/10* (2006.01)

(58) Field of Classification Search
USPC ..................................................... 293/97.23
See application file for complete search history.

(56) References Cited

U.S. PATENT DOCUMENTS

| | | | |
|---|---|---|---|
| 8,427,034 | B2 | 4/2013 | King et al. |
| 8,484,924 | B2 | 7/2013 | Braun |
| 8,607,532 | B2 | 12/2013 | Permesang |
| 2008/0209841 | A1 | 9/2008 | Leopolder et al. |
| 2008/0302060 | A1 | 12/2008 | Ciprian |
| 2011/0006562 | A1 | 1/2011 | Campbell et al. |
| 2011/0223372 | A1 | 9/2011 | Metz et al. |
| 2013/0048785 | A1 | 2/2013 | Grosse-Plankermann |
| 2013/0252529 | A1 | 9/2013 | Baldsiefen et al. |
| 2015/0145276 | A1* | 5/2015 | Preisler .................. B60R 13/013 296/97.23 |
| 2015/0233124 | A1 | 8/2015 | Carrubba |
| 2017/0370469 | A1 | 12/2017 | Roborel De Climens et al. |
| 2019/0276133 | A1 | 9/2019 | Hesslewood et al. |

FOREIGN PATENT DOCUMENTS

| | | |
|---|---|---|
| GB | 2 256 023 | 11/1992 |
| WO | WO 2010/078822 | 7/2010 |

OTHER PUBLICATIONS

Partial European Search Report and Provisional Opinion Accompanying the Partial Search Report prepared by the European Patent Office in application No. 19 158 756.7 dated May 23, 2019.
Laminate and Hardwood Flooring, Official Pergo site, retrieved from the internet: https://na.pergo.com. on Mar. 8, 2018.

* cited by examiner

FLOOR PANELS AND FLOORING SYSTEMS FOR A PASSENGER VEHICLE, AND METHODS FOR INSTALLATION

CROSS-REFERENCE TO RELATED APPLICATION

The present disclosure is a divisional of and claims priority to U.S. application Ser. No. 15/915,732, filed on Mar. 8, 2018 (issued as U.S. Pat. No. 10,919,612), the entire contents of which are herein incorporated by reference.

FIELD

The present disclosure generally relates to floor panels, and more particularly to, interlocking floor panels that can enable relative motion to occur between adjacent floor panels.

BACKGROUND

Cabin floors for commercial and military aircraft can typically include a structural sub-floor with a thin laminate covering and a top floor covering sealed to the thin laminate covering. A moisture barrier tape can be provided along seams of the sub-floor as well. Within this existing design, double back tape is laid down on the entire sub-floor area, to which the rigid laminate sections are laid and sealed. Then, a second layer of double back tape is laid over the laminate sections, followed by panels of the top floor covering. This technique described above for forming a floor can be a time consuming and difficult to repeat in a production environment. In addition, replacement or repair of a single floor structure panel can be difficult due to the panels being firmly bonded to each other.

At least some known conventional flooring for use in buildings, such as hardwood or solid, hard flooring (e.g., tile or laminate) may not be practical for use on an aircraft because the aircraft flooring described above is configured to withstand certain vertical loads (e.g., about three times gravity) that hard flooring used in buildings does not experience. Further, a sub-floor on an aircraft or other vehicle is configured to move (i.e., shift with respect to a structural component and/or flex), which can make traditional hardwood or solid flooring impractical. Additionally, hardwood flooring used in buildings can be relatively heavy, causing unnecessary extra weight on the aircraft. Also, during changes of altitude during a flight, air pockets in adhesives can expand and/or contract over time making a surface un-level when the aircraft is at cruise altitude (e.g., lower pressure). Moreover, hardwood flooring for use in buildings generally does not absorb noise as well as carpet, and spills can create a slip hazard on hard flooring types for use in buildings.

SUMMARY

In one example, a floor panel for a flooring system in an aircraft is described. The floor panel comprises a top sheet, a bottom sheet opposite the top sheet, a body comprising a plurality of cells each having a cavity therein and the body is situated between the top sheet and the bottom sheet, and an interlocking feature that extends outward from the body for slidably engaging an adjacent floor panel. The interlocking feature is formed via an outward extension of the bottom sheet beyond the top sheet such that the top sheet is raised with respect to the interlocking feature to create a seat configured for engaging the adjacent floor panel.

In another example, a flooring system in a passenger vehicle is described. The flooring system comprises a first set of floor panels including panels rigidly attached to a structure of the passenger vehicle, and a second set of floor panels. Each floor panel of the second set of floor panels has an interlocking feature for slidably engaging an adjacent floor panel, and the interlocking feature is configured to enable lateral relative motion to occur and restrict vertical relative motion between panels of the second set of floor panels and a respective adjacent floor panel. The second set of floor panels are positioned to define a space between a respective floor panel of the second set of floor panels and the respective adjacent floor panel to enable the lateral relative motion to occur between panels of the second set of floor panels and the respective adjacent floor panel, and each floor panel of the second set of floor panels is positioned to engage at least one adjacent floor panel of the first set of floor panels.

In another example, a method for installing a flooring system in a passenger vehicle is described. The method comprises attaching a first set of floor panels to a structure of the passenger vehicle at locations distributed throughout an area of the passenger vehicle, and positioning a second set of floor panels such that each floor panel of the second set of floor panels is positioned to engage at least one adjacent floor panel of the first set of floor panels. Each floor panel of the second set of floor panels has an interlocking feature for slidably engaging an adjacent floor panel, and the interlocking feature is configured to enable lateral relative motion to occur and restrict vertical relative motion between panels of the second set of floor panels and a respective adjacent floor panel. The second set of floor panels are positioned to define a space between a respective floor panel of the second set of floor panels and the respective adjacent floor panel to enable the lateral relative motion to occur between panels of the second set of floor panels and the respective adjacent floor panel; and filling the space with a sealant or an elastomer insert.

Various examples of the system(s) and apparatus(es) described herein may include any of the components, features, and functionalities of any of the other examples of the system(s) and apparatus(es) described herein in any combination.

Various examples of the method(s) described herein may include any of the components, features, and functionalities of any of the other examples of the method(s) described herein in any combination.

The features, functions, and advantages that have been discussed can be achieved independently in various examples or may be combined in yet other examples further details of which can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Within examples herein, components for interior cabin of a passenger vehicle, such as an aircraft, train, or ship, and specifically to floor coverings for passenger vehicles, are described. There is a long felt need for hardwood or solid, hard flooring on an aircraft, especially in some premier cabin areas. Thus, the embodiments described herein can provide a look and feel of hardwood flooring on an aircraft, taking the above and other factors into consideration. More specifically the floor structure described herein can reduce installation time, provide increased reliability and repeatability of installation, allow for improved aesthetics, increased durability, and/or provide the ability to replace individual panels.

Figure 1:
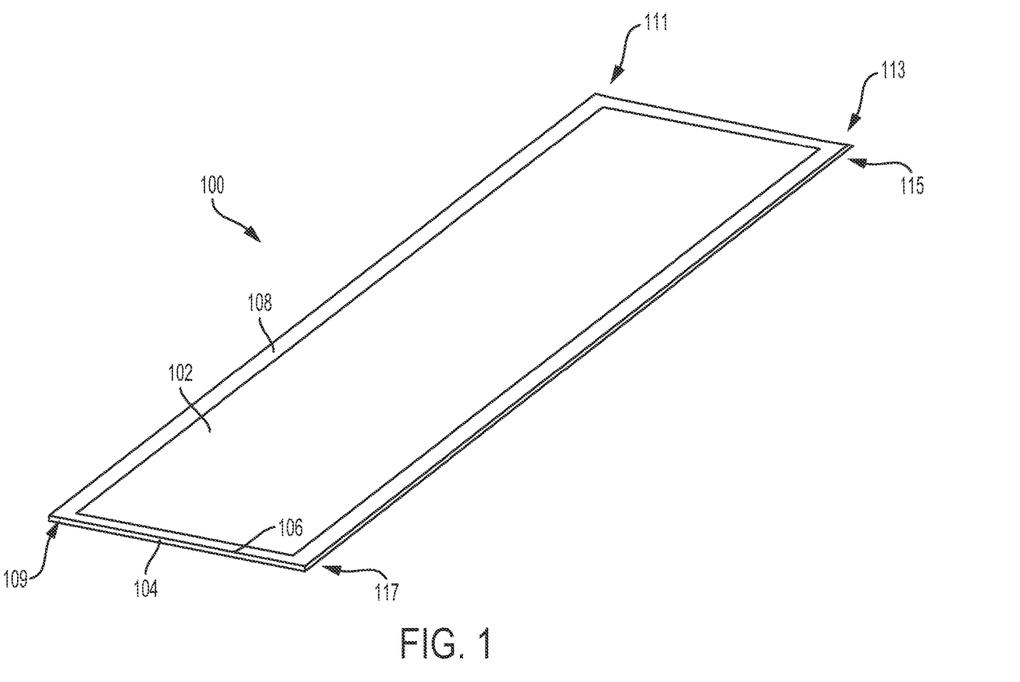
FIG. 1 is a top view of an example floor panel for a flooring system in an aircraft.
Figure 2:
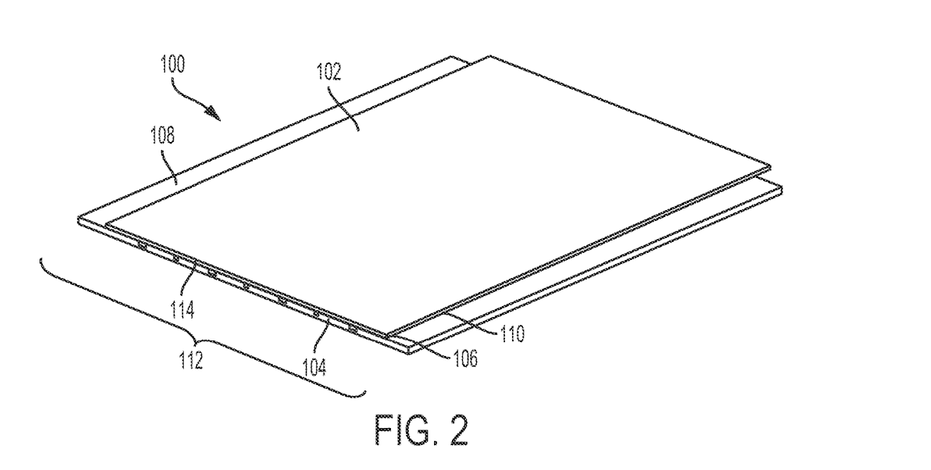
FIG. 2 is a top view of the floor panel of FIG. 1 showing a partial cross-section.

Referring now to the figures, FIG. 1 is a top view of an example floor panel 100 for a flooring system in an aircraft, according to an example. FIG. 2 is a top view of the floor panel 100 showing a partial cross-section. The floor panel 100 includes a top sheet 102, a bottom sheet 104 opposite the top sheet 102, and a body 106 situated between the top sheet 102 and the bottom sheet 104. The floor panel 100 also includes an interlocking feature 108 that extends outward from the body 106 for slidably engaging an adjacent floor panel. The interlocking feature 108 is formed via an outward extension 109 of the bottom sheet 104 beyond the top sheet 102 such that the top sheet 102 is raised with respect to the interlocking feature 108 to create a seat 110 configured for engaging the adjacent floor panel.

The body 106 comprises a plurality of cells 112 each having a cavity therein, such as cavity 114. Further description of the body 106 is below with reference to FIG. 4.

The interlocking feature 108 is configured to enable the floor panel 100 to slidably engage an adjacent floor panel during installation, as is more fully described below. For example, the seat 110 is configured for engaging the adjacent floor panel 124, and the seat 110 includes the interlocking feature 108 abutting the top sheet 102 at about a 90° angle. However, the interlocking feature 108 can abut the top sheet 102 at any suitable angle that can enable the floor panel 100 to engage the adjacent floor panel 124.

Within examples, the top sheet 102, the bottom sheet 104, the body 106, and the interlocking feature 108 are a single piece construction. Thus, the floor panel 100 may be an integral piece manufactured using additive manufacturing or three-dimensional (3D) printing techniques. The top sheet 102, the bottom sheet 104, the body 106, and the interlocking feature 108 may include a composite material resulting in a non-textile floor covering, for example. In yet further examples, the floor panel 100 includes an integral, single piece construction of multi-material layers, where a material used for the bottom sheet 104 differs from a material used for the top sheet 102. The floor panel 100 can be manufactured to have a specific pattern embossed thereon to match a specific location in the aircraft (e.g., around doors/galleys).

Figure 3:
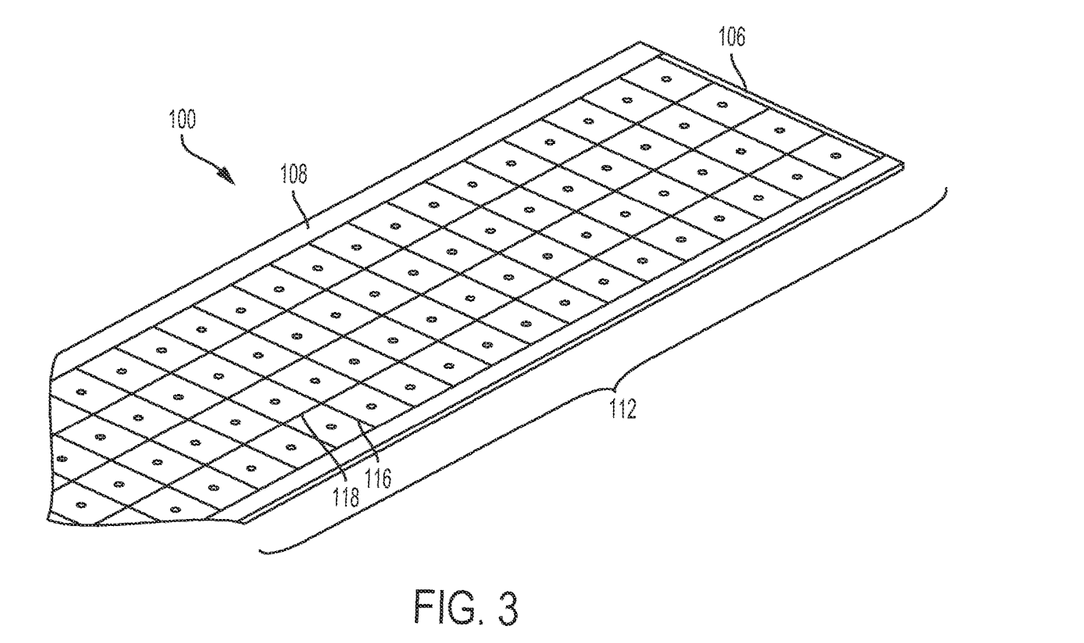
FIG. 3 is a bottom view of the floor panel of FIGS. 1 and 2 showing another partial cross-section.

FIG. 3 is a bottom view of the floor panel 100 showing another partial cross-section, according to an example. In FIG. 3, the bottom sheet 104 is not shown, and thus, the plurality of cells 112 of the body 106 are shown. The plurality of cells 112 are each internal to the body 106, and a respective cavity is defined between the top sheet 102, the bottom sheet 104, and first and second internal walls 116, 118 of the body 106. The internal walls 116, 118 are oriented perpendicular to each other to create the internal cellular structure of the body 106. Many internal walls are included to create a number of rows and columns of cells, for example. Further, the first internal walls 116 can be at any suitable orientation to the second internal walls 118 rather than perpendicular.

The plurality of cells 112 of the body 106 each have a cavity (e.g., shown in FIG. 4 as cavity 114) and can allow the floor panel 100 to be lightweight, as compared to floor panels having a solid structure. Using composite materials for the floor panel 100 with the cellular structure can enable a high weight-to-stiffness ratio in comparison to use of solid materials, for example.

Figure 4:
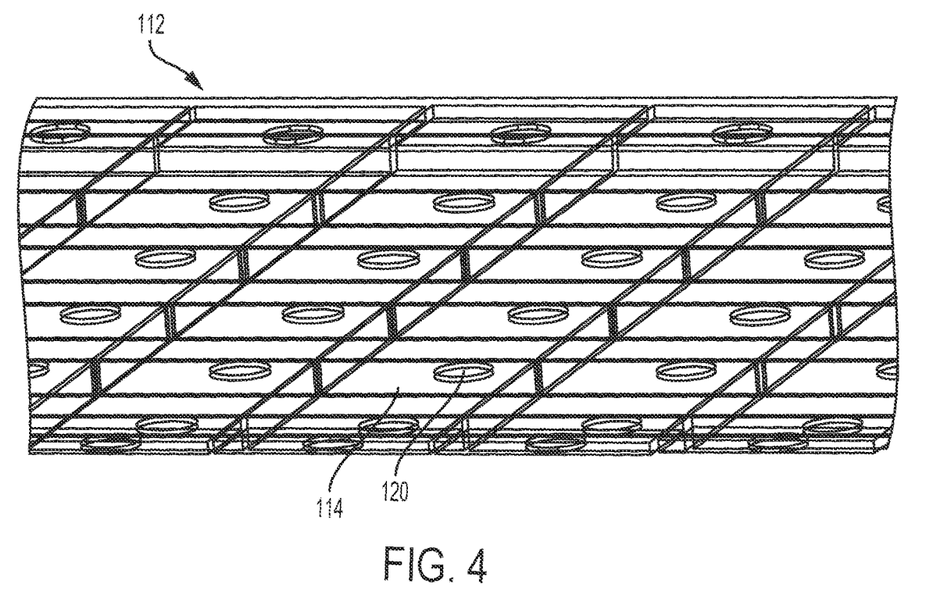
FIG. 4 is a transparent view of a portion of the floor panel of FIGS. 1 to 3 to show an example of the plurality of cells.

FIG. 4 is a transparent view of a portion of the floor panel 100 to show an example of the plurality of cells 112. As shown each cell of the plurality of cells 112 has a volume that defines a cavity, such as the cavity 114 of a particular cell. Holes, such as hole 120, are included in each cell 112 based on a manufacturing technique and to allow for further weight reduction, for example. The plurality of cells 112 can include rectangular or square-like structures arranged in rows and columns as shown in FIG. 4; however, each cell 112 can have any suitable shape that is configured to enable the body 106 to function as described herein.

Figure 5:
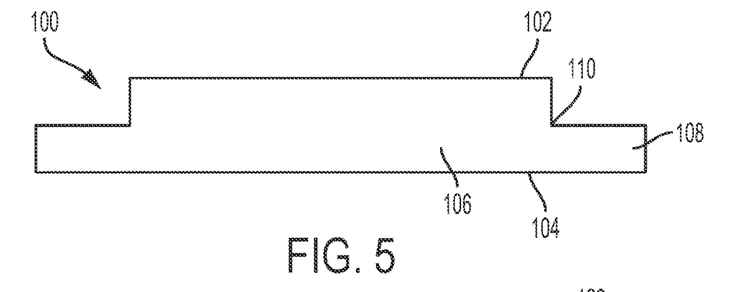
FIG. 5 is a side view of the floor panel of FIGS. 1 to 4.

FIG. 5 is a side view of the floor panel 100. The seat 110 is shown more clearly in FIG. 5 as the interlocking feature 108 abutting the top sheet 102 at about a 90° angle. However, the seat 110 can be configured at other angles including greater than a 90° angle or less than a 90° angle to provide alternate interlocking mechanisms, for example. For example, the interlocking feature 108 may include a lip that extends outward from the body 106 of the floor panel 100 to engage an adjacent floor panel during installation.

Figure 6:
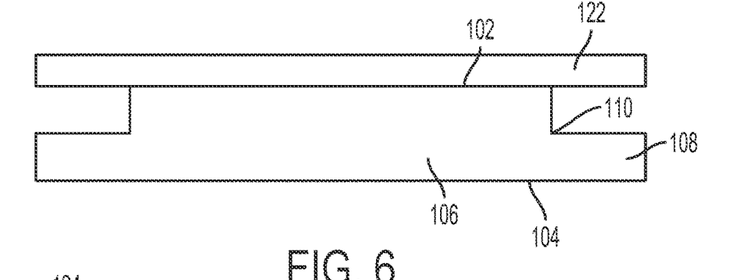
FIG. 6 is another side view of the floor panel of FIGS. 1 to 4 with a surface on the floor panel.

FIG. 6 is another side view of the floor panel 100. In FIG. 6, a surface 122 is positioned on the top sheet 102. The surface 122 may be a grip surface (e.g., rubber material), a decorative surface (e.g., a pattern resembling wood grain embossed in a substrate, or texture of wood grain printed into a substrate with a rubberized surface on top of the embossed and/or printed substrate for grip surface), and/or any other aesthetic desired. The surface 122 is a surface on which passengers of the aircraft walk, and thus, a non-slip surface is desired.

Figures 7, 8:
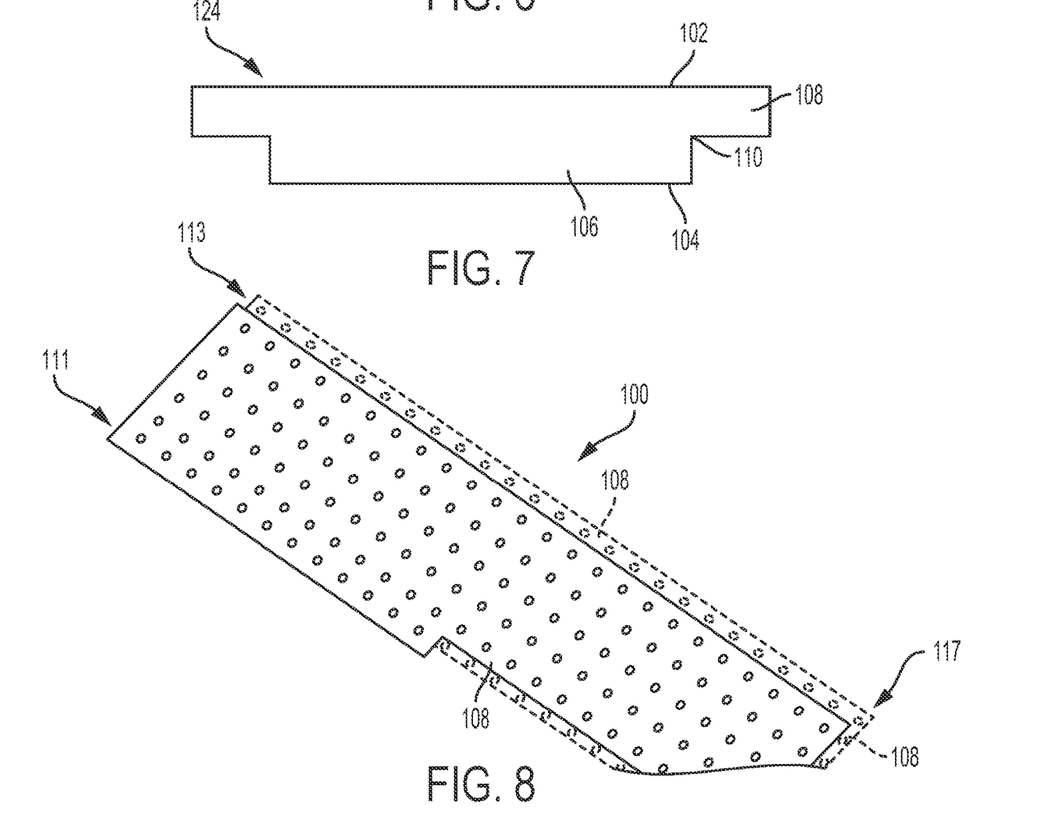
FIG. 7 is a side view of another example of another floor panel.
FIG. 8 is another top view of another example of the floor panel.

FIG. 7 is a side view of another example of another floor panel 124. In FIG. 7, the floor panel 124 is substantially the same as the floor panel 100 and includes the top sheet 102, the bottom sheet 104, the body 106, the interlocking feature 108, and the seat 110. The floor panel 124 is configured such that the interlocking feature 108 fits into a corresponding interlocking feature 108 of the floor panel 100. The floor panel 100 may be considered to be configured in a male or female format, and the floor panel 124 is considered in the opposite format such that the floor panels 100 and 124 interlock to one another.

Within some examples, as shown in FIG. 1, the interlocking feature 108 extends along at least a portion of a perimeter of the body 106. The perimeter includes two opposing sides 111 and 113 and two opposing ends 115 and 117 of the floor panel 100. In one example, the interlocking feature 108 extends along both sides 111 and 113 and both ends 115 and 117 of the floor panel 100. In other examples, the interlocking feature 108 extends along one of the sides 111 and 113 or both ends 115 and 117 of the body 106, but not along the other side 111/113 of the body 106.

FIG. 8 is another top view of an example of the floor panel 100, according to an example implementation. In FIG. 8, the interlocking feature 108 extends along one entire side 113, but only partially along an opposing side 111 of the floor panel 100, and then also only along one end 117 of the floor panel 100. Thus, the floor panel 100 may be configured in many different configurations to fit a number of different floor covering areas on an aircraft 150 or other passenger vehicle, and the interlocking feature 108 can be included on one or both sides 111 and 113 of the body 106, one or both ends 115 and 117 of the body 106, or any combination of sides and ends of the body 106, for example. The floor panel 100 can also be configured in a number of different sizes with different lengths and widths. In some examples, the floor panel 100 may be five feet (1.52 meters) long for a floor covering along a walkway in an aircraft 150.

Figure 9:
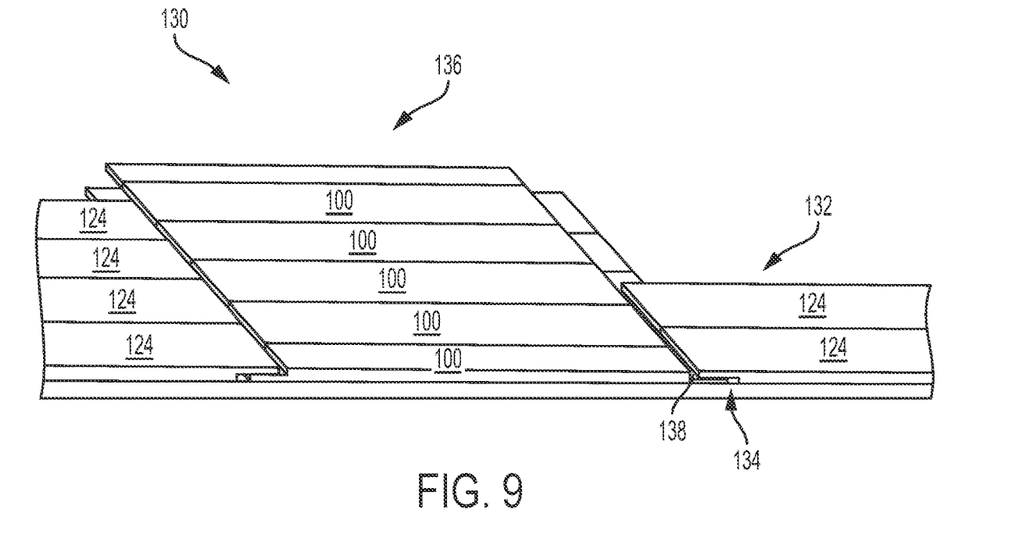
FIG. 9 illustrates an example flooring system in a passenger vehicle, such as an aircraft.

FIG. 9 illustrates an example flooring system 130 in an aircraft 150, according to an example implementation. The flooring system 130 includes a first set 132 of floor panels 100 including floor panels 100 attached or rigidly attached to a structure 134 of the aircraft. More specifically, the floor panels 124 of the first set 132 are rigidly attached to the structure 134 by permanent adhesive, screws, bolts, snap-fit, etc. The flooring system 130 also includes a second set 136 of floor panels 100, and each floor panel 100 of the second set 136 of floor panels has the interlocking feature 108 for slidably engaging an adjacent floor panel 124 (further shown in FIG. 10). The interlocking feature 108 is configured to enable lateral relative motion to occur and restrict vertical relative motion between panels 100 of the second set 136 of floor panels 100 and a respective adjacent floor panel 124, for example (described more fully below). The second set 136 of floor panels are positioned to define a space 138 between the floor panel 100 and the respective adjacent floor panel 124 to enable the lateral relative motion to occur between panels 100 of the second set of 136 floor panels and the respective adjacent floor panel 124. Each floor panel 100 of the second set 136 of floor panels is positioned to engage at least one adjacent floor panel 124 of the first set 132 of floor panels.

The first set 132 of floor panels is attached to the structure 134 of the aircraft. For example, the first set 132 of floor panels can be attached directly to the structure 134 of the aircraft 150 using screws, bolts, snap-fit, and/or any other suitable mechanical fastening device(s).

Each panel of the first set 132 of floor panels may be configured as the floor panel 124 shown in FIG. 7, and each panel of the second set 136 of floor panels may be configured as the floor panel 100 shown in FIG. 1. Following, a panel of the second set 136 of floor panels has the interlocking feature 108 for slidably engaging an adjacent floor panel 124, which may be a floor panel of the first set 132 of floor panels, as shown in FIG. 9 (although other installation configurations exist as described below).

In the configuration shown in FIG. 9, the flooring system 130 includes the first set 132 of floor panels and the second set 136 of floor panels arranged in alternating rows. Additional configurations of the flooring system 130 are possible and are described below (with reference to FIG. 14).

Figure 10:
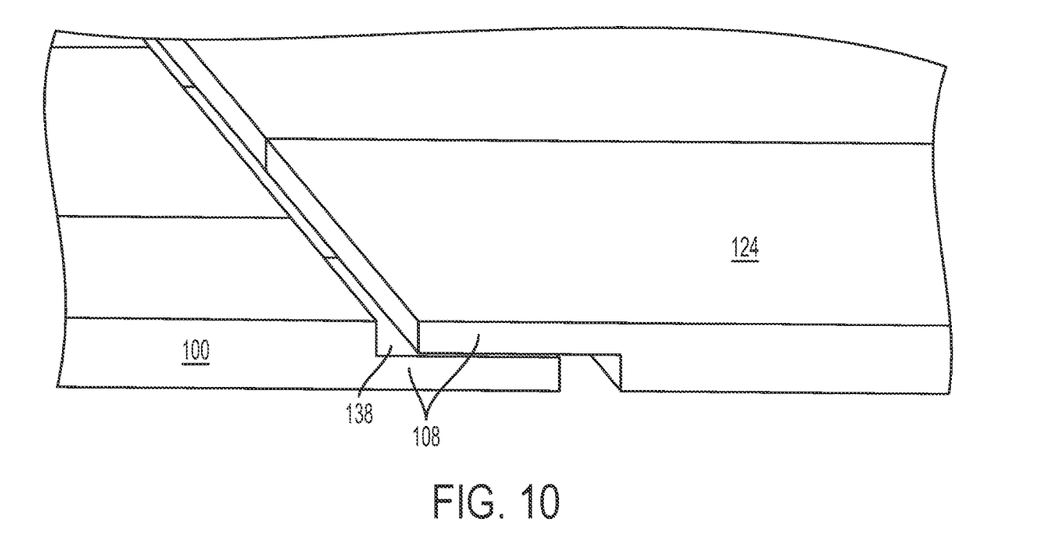
FIG. 10 illustrates a magnified view of a portion of the flooring system of FIG. 9.

FIG. 10 illustrates a magnified view of a portion of the flooring system 130, according to an example implementation. As shown in FIG. 10, the interlocking feature 108 is configured to enable lateral relative motion to occur between panels of the second set 136 of floor panels and a respective adjacent floor panel due to the space 138. The panels 100 and 124 may move toward and away from each other such that the width of the space 138 changes, for example. The interlocking feature 108 is also configured to restrict vertical relative motion between panels of the second set 136 of floor panels and a respective adjacent floor panel due to the interlocking feature 108 of the panel 100 abutting the interlocking feature 108 of the panel 124.

Thus, within examples herein, the flooring system 130 can enable the floor panels 100 of the second set 136 of floor panels to be capable of floating (e.g., free to move with respect to a fixed structure) on the aircraft subfloor (e.g., the structure 134 of the aircraft). The floor panel 100 has the interlocking feature 108 that fits with an adjacent floor panel 124 such that the floor panel 100 can float laterally, but the interlocking feature 108 prevents the floor panel 100 from lifting off the subfloor, such as the structure 134.

Dynamics and loads applied to the flooring system 130 due to the aircraft 150 being in flight means that the flooring system 130 is configured to withstand determined forces (e.g., about three times the weight of the flooring system 130 of applied force pulling up on the flooring system 130 and about nine times the weight of the flooring system 130 of applied force pulling forward on the flooring system 130). The flooring system 130 thus can enable compliance with the mechanics of dynamic loads experienced in the aircraft 150 (e.g., flight loads and thermal contraction at altitude) while maintaining respective floor panels 100, 124 substantially in place (e.g., movable only within an area of the space 138) with respect to each other and the structure 134.

By allowing the floor panels 100 to move relative to adjacent floor panels 124, the flooring system 130 remain substantially in place, but has components that are allowed to float laterally to reduce stress on the flooring system 130 caused by mechanics of aircraft operation.

Figure 11:
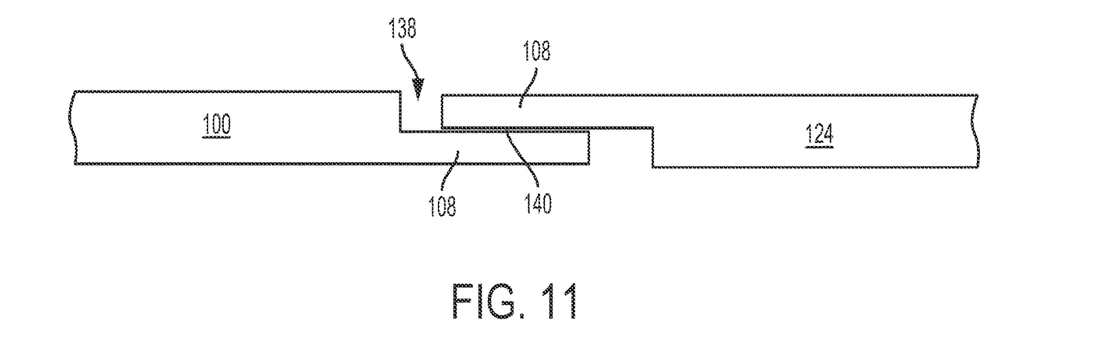
FIG. 11 is a side view of a portion of the flooring system of FIG. 9 showing the floor panel interlocked with an adjacent floor panel.

FIG. 11 is a side view of a portion of the flooring system 130 showing the floor panel 100 interlocked with an adjacent floor panel 124. The space 138 is present when the two floor panels are interlocked. The interlocking feature 108 of each respective floor panel 100, 124 is configured to restrict the vertical relative motion between the floor panel 100 and the floor panel 124 by preventing the floor panel 100 from moving in a direction perpendicular to a surface of the floor panel 100, for example. As shown in FIG. 11, the interlocking feature 108 (i.e., a lip) of the floor panel 100 abuttingly contacts the interlocking feature 108 (i.e., a lip) of the adjacent floor panel 124 at a surface 140.

Figure 12:
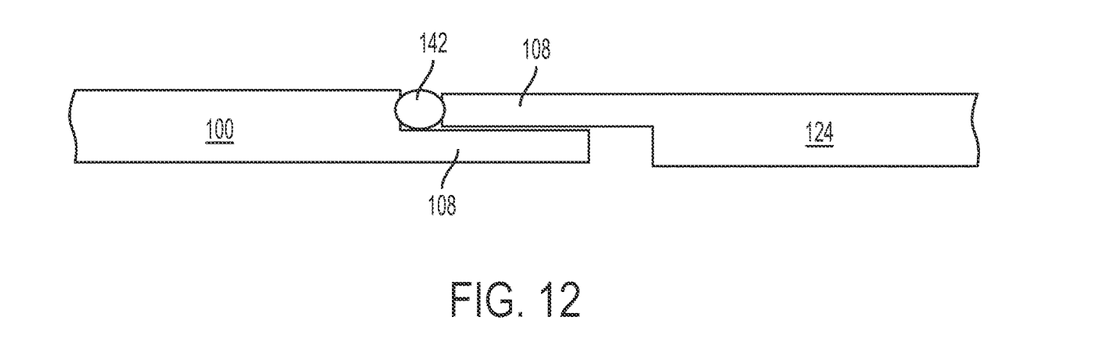
FIG. 12 is another side view of a portion of the flooring system of FIG. 9 showing the floor panel interlocked with an adjacent floor panel.

FIG. 12 is another side view of a portion of the flooring system 130 showing the floor panel 100 interlocked with an adjacent floor panel 124. In FIG. 12, a sealant 142 is positioned into the space 138. The sealant 142 may be compressed allowing for the relative lateral motion between the floor panel 100 and the floor panel 124. The sealant 142 fills all or substantially all of a volume of the space 138 to prevent any foreign materials or substance from being lodged into the space 138, and to provide a smooth and uniform exterior surface onto which the surface 122 can be positioned.

Figure 13:
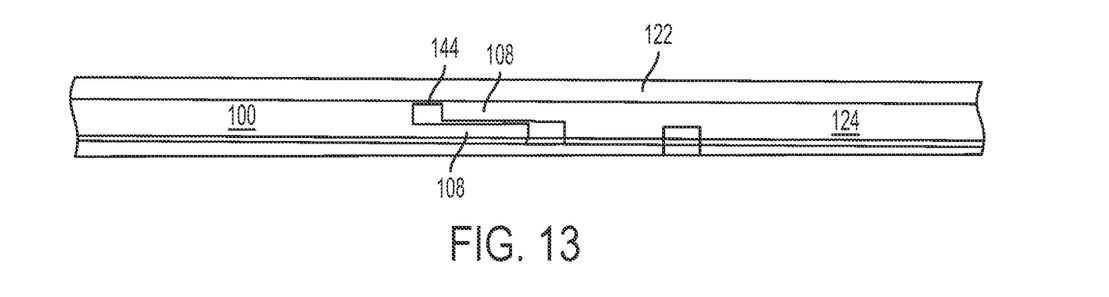
FIG. 13 is another side view of a portion of the flooring system of FIG. 9 showing the floor panel interlocked with an adjacent floor panel.

FIG. 13 is another side view of a portion of the flooring system 130 showing the floor panel 100 interlocked with an adjacent floor panel 124. In FIG. 13, an elastomer insert 144 is positioned into the space 138. The elastomer insert 144 may be an extruded rubber piece, for example. The elastomer insert 144 may be configured in a "P-shape" (i.e., a shape having a relatively linear portion with a substantially arcuate portion attached to the relatively linear portion) such that a portion (i.e., the relatively linear portion) of the elastomer insert 144 slides underneath the interlocking feature 108 of the floor panel 124 and another portion (i.e., the substantially arcuate portion) of the elastomer insert 144 fills or substantially fills the volume of the space 138. The surface 122 is then positioned onto the floor panels 100 and 124 over the elastomer insert 144. Thus, within examples, the relative motion of the floor panels 100 between anchor points (e.g., locations where the floor panels 124 are attached to the structure 134) of the first set 132 of floor panels is absorbed by joints between adjacent panels that can be filled with the sealant 142 (e.g., rubberized sealant) or the elastomer insert 144.

Figure 14:
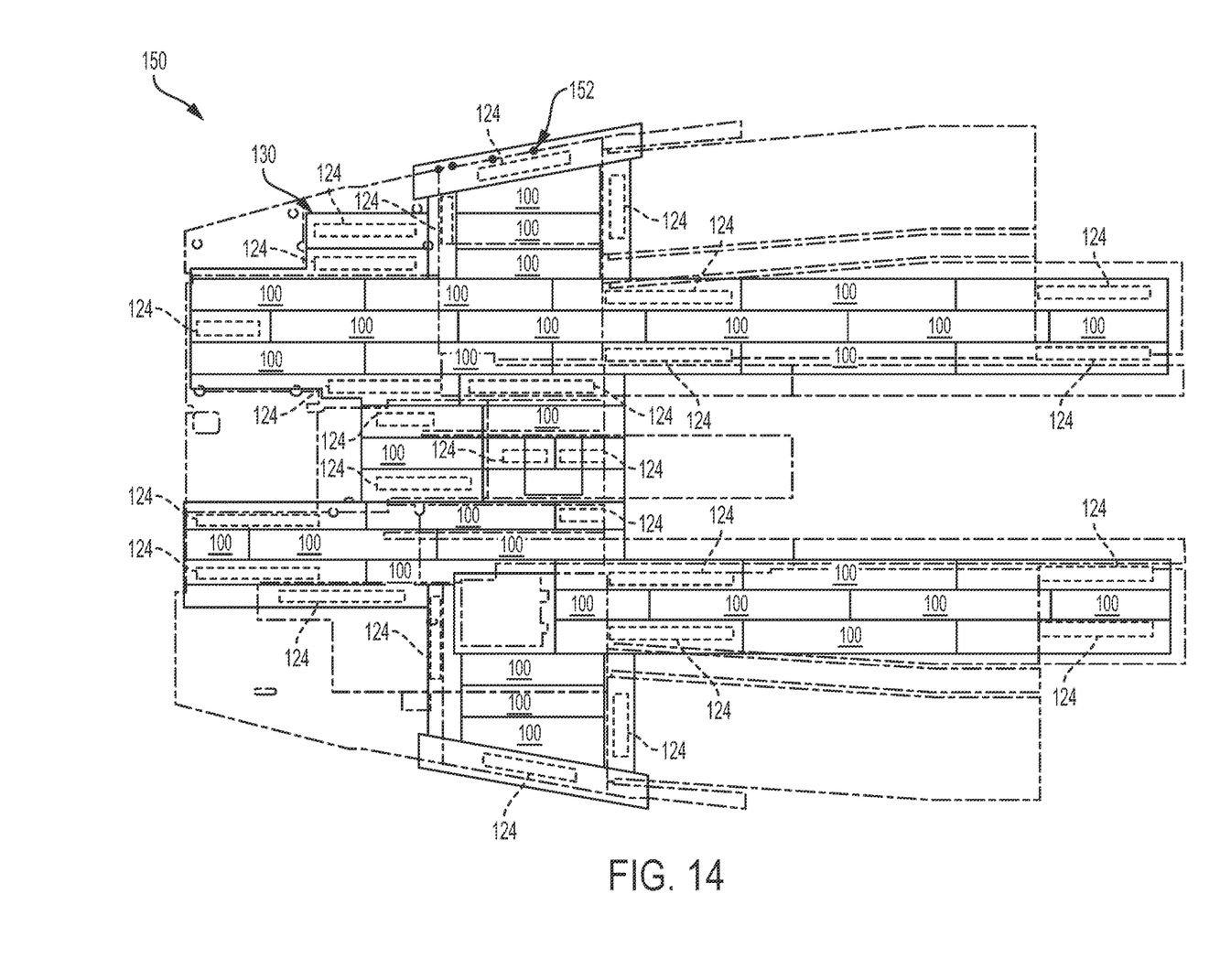
FIG. 14 illustrates a schematic layout of the flooring system in a portion of a passenger vehicle, such as an aircraft.

FIG. 14 illustrates a schematic layout of the flooring system 130 in a portion of an aircraft 150 or other passenger vehicle, according to an example implementation. In FIG. 14, various areas of the aircraft 150 are shown including galley areas and seating areas. FIG. 14 illustrates a specific layout for a specific aircraft design in which the floor panel 124 is distributed throughout the area in a manner such that all of the floor panels 100 contact and are adjacent to at least one of the floor panels 124 along at least one side or one end. In this way, the floor panel 100 abuts at least one floor panel 124 that is rigidly attached to the structure 134 of the aircraft 150.

In some examples, some floor panels 100 of the second set 136 of floor panels are positioned to engage both a respective floor panel 124 of the first set 132 of floor panels and a respective floor panel 100 of the second set 136 of floor panels. This may occur, for example, using a configuration of the floor panel 100 shown in FIG. 8 or other specifically configured panels with associated interlocking features 108 in a male/female format as needed.

In FIG. 14, some of the floor panels 124 of the first set 132 of floor panels are anchored to the structure 134 of the aircraft 150 at a perimeter area 152 of the aircraft 150. In addition, some of the floor panels 124 of the first set 132 of floor panels are anchored to the structure 134 of the aircraft 150 at one or more door interfaces of the aircraft 150. Locations where the floor panels 124 are attached to the structure 134 can be referred to as "anchor points". A specific arrangement and location of the floor panels 124 can depend on a design of the aircraft 150.

In addition, within examples and based on a configuration of the floor panel 100, the second set 136 of floor panels can be positioned to define the space 138 between the floor panels 100 and the respective adjacent floor panels 124 provided along a perimeter of the second set 136 of floor panels to enable the relative motion to occur both laterally and longitudinally. In addition or alternatively, in other arrangements, the second set 136 of floor panels can be positioned to define the space 138 between the floor panels 100 and the respective adjacent floor panels 124 provided along one of both sides 111 and 113 of the second set 136 of floor panels or both ends 115 and 117 of the second set 136 of floor panels to enable the relative motion to occur either laterally and longitudinally. For example, the interlocking feature 108 of each floor panel 100, 124 is configured to enable relative longitudinal motion to occur between panels 100 of the second set 136 of floor panels and the respective adjacent floor panel 124.

Within examples, the space 138 may be in a range of about 0.1 inches (2.54 millimeters) to about 0.2 inches (5.08 millimeters). However, a size of the space 138 can be different from the previously-mentioned range due to a size of the floor panel being used. Further, during use the size of the space 138 can vary as the floor panels 100, 124 move relative to each other.

Figure 15:
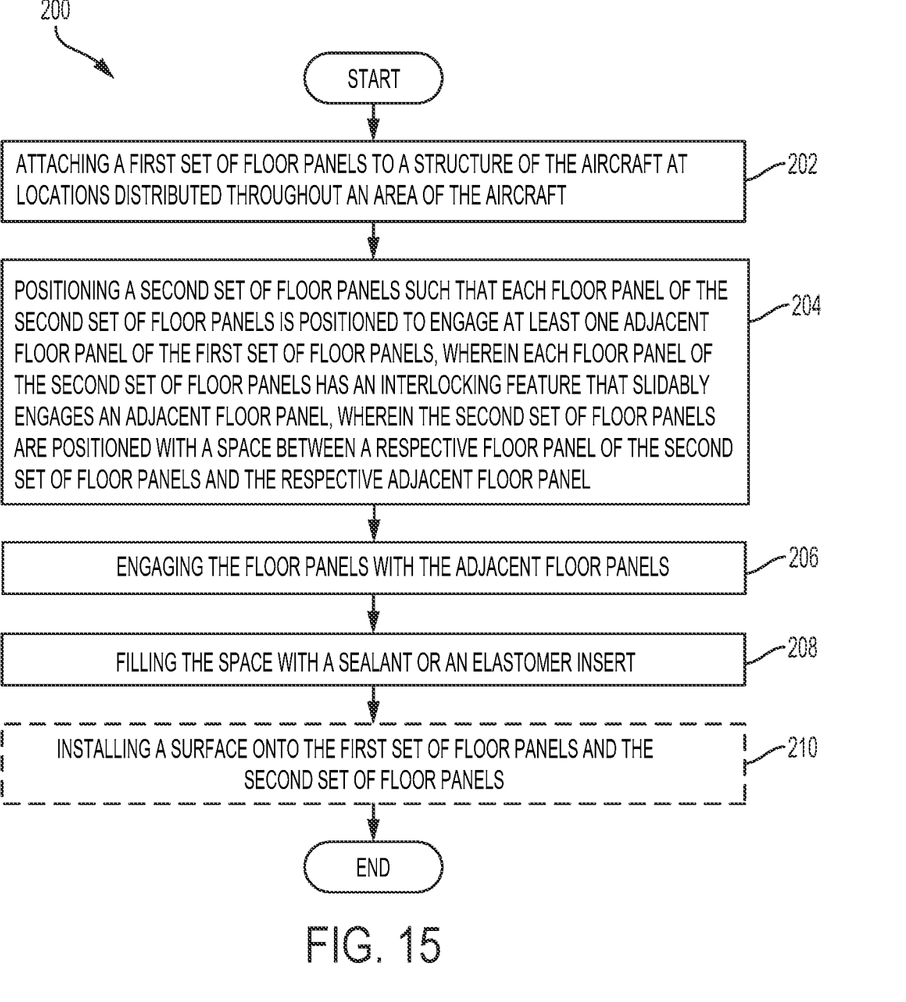
FIG. 15 shows a flowchart of an example method for installing the flooring system in the aircraft.

FIG. 15 shows a flowchart of an example method 200 for installing the flooring system 130 in the aircraft 150, according to an example implementation. Method 200 shown in FIG. 15 presents an example of a method that could be used with the floor panel 100 and the floor panel 124 shown in FIGS. 1-8, and/or the flooring system 130 shown in FIGS. 9-14, for example. In some instances, components and/or apparatuses may be configured to be used in the functions such that the components are actually configured and structured to enable such performance. In other examples, components and/or apparatuses may be arranged to be adapted to, capable of, or suited for performance of the functions. Method 200 may include one or more operations, functions, or actions as illustrated by one or more of blocks 202-210. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 202, the method 200 includes attaching the first set 132 of floor panels to the structure 134 of the aircraft 150 at locations distributed throughout an area of the aircraft

150. For example, the floor panels 124 of the first set 132 are rigidly attached to the structure 134 by permanent adhesive, screws, bolts, snap fit, or bonding or being adhered to the structure 134 in a suitable fashion.

At block 204, the method 200 includes positioning the second set 136 of floor panels such that each floor panel of the second set 136 of floor panels is positioned to engage at least one adjacent floor panel of the first set 132 of floor panels. Each floor panel of the second set 136 of floor panels has the interlocking feature 108 that slidably engages an adjacent floor panel. As discussed above, the interlocking feature 108 is configured to enable lateral relative motion to occur and restrict vertical relative motion between panels of the second set 136 of floor panels and a respective adjacent floor panel. The second set 136 of floor panels are positioned to define the space 138 between a respective floor panel 100 of the second set 136 of floor panels and the respective adjacent floor panel 100/124 to enable the lateral relative motion to occur between panels of the second set 136 of floor panels and the respective adjacent floor panel.

At block 206, the method can include engaging the floor panels 100 with the adjacent floor panels 124 by interlocking the interlocking features 108 of each respective floor panel so that the interlocking features 108 of respective floor panels abut each other.

At block 208, the method 200 includes filling the space 138 with the sealant 142 or the elastomer insert 144.

At block 210, the method 200 can include installing a surface 122 onto the first set 132 of floor panels and the second set 136 of floor panels.

Figure 16:
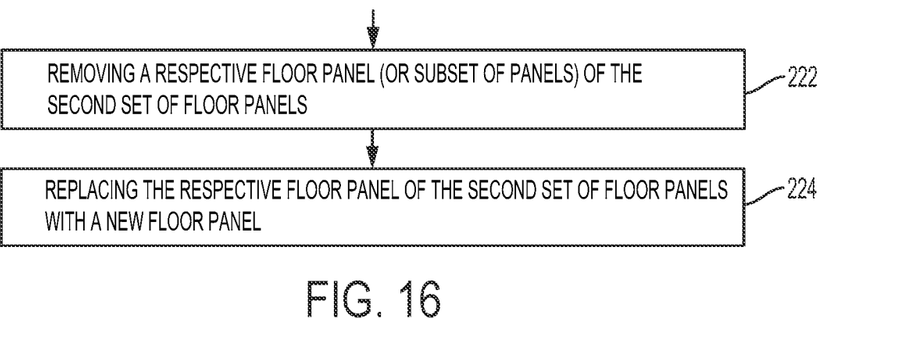
FIG. 16 shows a flowchart of additional functions that may be used with or after implementation of the method in FIG. 15.

FIG. 16 shows a flowchart of additional functions that may be used with or after implementation of the method 200 in FIG. 15. At block 222, additional functions include removing a respective floor panel 100 (or subset of panels) of the second set 136 of floor panels. In some examples, removing a subset of panels can include removing all panels of the flooring system 130 and replacing the removed panels with new floor panels for a new flooring system 130 to change a floor of the passenger vehicle.

In still further examples, additional functions can include removing a respective floor panel 124 of the first set 132 of floor panels by detaching the respective floor panel 124 from the structure 134.

At block 224, additional functions include replacing the respective floor panel 100 of the second set 136 of floor panels with a new floor panel. Replacing the respective floor panel 100 can include inserting a new floor panel 100 (or group of panels) into an opening left by removing the respective floor panel 100 (or subset of panels). The insertion of the new floor panel 100 can be made due to the space 138 present between respective panels in the flooring system 130, and by engaging respective interlocking features 108 of the new floor panel 100 with an existing panel in the flooring system 130.

In still further examples, additional functions can include replacing a respective floor panel 124 of the first set 132 of floor panels with a new floor panel by reattaching the new floor panel to the structure 134.

Example processes illustrated in the flowcharts in FIG. 15 may be performed or carried out manually by a system integrator, a maintenance/repair/overhaul company, other third party, and/or an operator (e.g., an airline or other transport company). The example processes illustrated in the flowcharts in FIG. 15 can enable a reduced installation time of flooring panels due to less installation materials required and lack of rigid attachment of each individual floor panel of the flooring system 130 to the structure 134 of the aircraft 150. Rather, only panels in the first set 132 of floor panels can be attached to the structure 134 of the aircraft 150.

The example processes illustrated in the flowcharts in FIG. 15 also can enable increased reliability and repeatability of installation, as well as improved aesthetics and customer satisfaction. Furthermore, the example processes illustrated in the flowcharts in FIG. 15 can enable increased durability and ability to replace individual panels because the floor panels are not bonded to each other in a permanent manner.

The installation of a non-textile flooring system 130 in commercial passenger aircraft or other vehicle, such as in galley areas of a passenger vehicle, can enable customized aesthetic floor coverings in contrast to the use of generic floor mats. In addition, examples described herein can avoid issues of buckling of floor coverings because the floor panels are allowed to move relative to each other. Thus, floor panels of the flooring system 130 described herein may not telegraph, buckle, or blister because the interlocking feature 108 of the floor panels 100 will allow relative lateral motion to occur between the floor panels while ensuring that the floor panels 100 do not lift when an upward load is applied.

Furthermore, within examples, it is possible to replace a single floor panel if the panel becomes worn, damaged, defective, or otherwise undesirable for use. For example, because the floor panels may move relative to each other, a softer non-adhesive sealant can be used that is not permanent, thereby allowing easy replacement of one or more floor panels.

In addition, using the flooring system 130 described herein, a thin laminate layer is not required over the aircraft subfloor. Rather, floor panels of the flooring system 130 can be directly attached to the structure 134 of the aircraft 150, within examples.

Unless otherwise indicated, the terms "first", "second", etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

By the term "substantially" and/or "about" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Different examples of the system(s), apparatus(es), and method(s) disclosed herein include a variety of components, features, and functionalities. It should be understood that the various examples of the system(s), apparatus(es), and method(s) disclosed herein may include any of the components, features, and functionalities of any of the other examples of the system(s), apparatus(es), and method(s) disclosed herein in any combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

It is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims.

What is claimed is:

1. A floor panel for a flooring system in a passenger vehicle, the floor panel comprising:
   a top sheet;
   a bottom sheet opposite the top sheet;
   a body comprising a plurality of cells each having a cavity therein, the body situated between the top sheet and the bottom sheet, wherein the plurality of cells are each internal to the body and a respective cavity is defined between the top sheet, the bottom sheet, and internal walls of the body, and wherein cells of the plurality of cells include holes for weight reduction that extend from the body through the bottom sheet; and
   an interlocking feature that extends outward from the body for slidably engaging an adjacent floor panel, wherein the interlocking feature is formed via an outward extension of the bottom sheet beyond the top sheet such that the top sheet is raised with respect to the interlocking feature to create a seat configured for engaging the adjacent floor panel.

2. The floor panel of claim 1, wherein the internal walls are oriented perpendicular to each other to create an internal cellular structure of the plurality of cells of the body.

3. The floor panel of claim 2, wherein the internal cellular structure is configured in a number of rows and columns of cells.

4. The floor panel of claim 1, wherein the interlocking feature extends along a perimeter of the body.

5. The floor panel of claim 1, wherein the interlocking feature extends along one of both sides of the body or both ends of the body.

6. The floor panel of claim 1, wherein the interlocking feature extends along one entire side of the body and also only partially along an opposing side of the body.

7. The floor panel of claim 1, wherein the top sheet, the bottom sheet, the body, and the interlocking feature are a single piece construction.

8. The floor panel of claim 1, wherein the seat comprises the interlocking feature abutting the top sheet at about a 90° angle.

9. The floor panel of claim 1, wherein the seat comprises the interlocking feature abutting the top sheet at about an angle greater than a 90° angle.

10. The floor panel of claim 1, further comprising:
    a grip surface positioned on the top sheet.

11. The floor panel of claim 1, further comprising:
    a decorative surface positioned on the top sheet.

12. The floor panel of claim 1, wherein the interlocking feature is configured to restrict a vertical relative motion with the adjacent floor panel.

13. The floor panel of claim 1, wherein the interlocking feature is configured to enable relative longitudinal motion to occur with the adjacent floor panel.

14. An aircraft comprising a plurality of the floor panels of claim 1.

15. The floor panel of claim 1, wherein the outward extension of the bottom sheet beyond the top sheet also includes holes.

16. A floor panel for a flooring system in a passenger vehicle, the floor panel comprising:
    a top sheet;
    a bottom sheet opposite the top sheet;
    a body comprising a plurality of cells each having a cavity therein, the body situated between the top sheet and the bottom sheet, wherein the plurality of cells are each internal to the body and a respective cavity is defined between the top sheet, the bottom sheet, and internal walls of the body, and wherein cells of the plurality of cells include holes for weight reduction that extend from the body through the bottom sheet; and
    an interlocking feature that extends outward from the body for slidably engaging an adjacent floor panel, wherein the interlocking feature is formed via an outward extension of the top sheet beyond the bottom sheet such that the bottom sheet is recessed with respect to the interlocking feature to create a seat configured for engaging the adjacent floor panel.

17. The floor panel of claim 16, wherein the internal walls are oriented perpendicular to each other to create an internal cellular structure of the plurality of cells of the body.

18. The floor panel of claim 16, wherein the interlocking feature extends along a perimeter of the body.

19. The floor panel of claim 16, wherein the interlocking feature extends along one of both sides of the body or both ends of the body.

20. The floor panel of claim 16, wherein the outward extension of the top sheet beyond the bottom sheet also includes holes.

* * * * *